H. MOERBE.
NUT LOCK.
APPLICATION FILED MAY 5, 1915.
1,158,260. Patented Oct. 26, 1915.
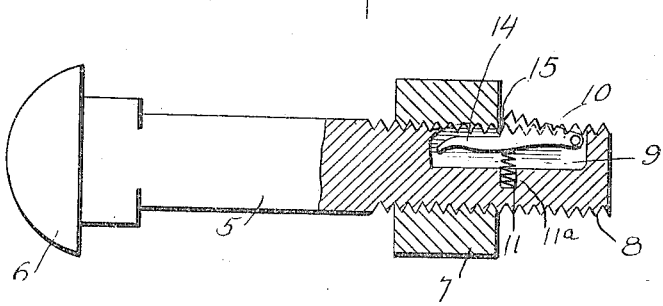
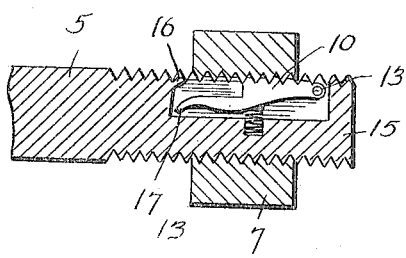 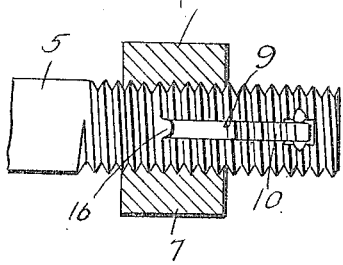
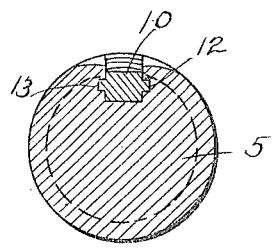
Witnesses
R N Jones
Inventor
H. Moerbe
By
Attorney

UNITED STATES PATENT OFFICE.

HERMAN MOERBE, OF GIDDINGS, TEXAS.

NUT-LOCK.

1,158,260.　　　Specification of Letters Patent.　　Patented Oct. 26, 1915.

Application filed May 5, 1915.　Serial No. 26,029.

*To all whom it may concern:*

Be it known that I, HERMAN MOERBE, a citizen of the United States, residing at Giddings, in the county of Lee and State of Texas, have invented certain new and useful Improvements in Nut-Locks; and I do hereby declare the following to be a full, clear, and exact description of the invention, such as will enable others skilled in the art to which it appertains to make and use the same.

This invention has for its primary object to provide a simple and efficient nut lock embodying essentially a spring actuated locking element pivotally mounted in a slot formed in the bolt and having a shoulder adapted to engage behind the nut to lock the latter against removal.

With this and other objects in view, the invention consists in the novel construction, arrangement and formation of parts as will be hereinafter specifically described, claimed and illustrated in the accompanying drawing, in which:

Figure 1 represents a side elevation of the improved nut lock, partly in section. Fig. 2 represents a fragmental sectional view of the threaded extremity of the bolt and nut, illustrating the position of the pivoted locking member as the nut is advanced upon the bolt. Fig. 3 represents a fragmental side elevation of the bolt and locking element, showing the nut in section, and Fig. 4 represents a transverse sectional view in the plane of the pivotal axis of the locking element.

Referring to the drawing in detail, wherein similar reference numerals designate corresponding parts throughout the several views, the numeral 5 indicates the shank of a bolt of the usual or any preferred construction having a head 6 at one end and external screwthreads 8 at the opposite end adapted to fit the internally threaded bore of a nut 7.

The threaded extremity of the bolt 5 is formed inwardly of the end with a longitudinal groove or slot 9 constituting a seat for the nut locking element, designated generally by the numeral 10. The outer extremity of the locking element 10 is formed with a pair of oppositely directed bosses 12 engaged within recesses 13 formed in the side walls of the groove or slot 9, whereby the locking element is pivotally secured to the bolt. The opposite or inner extremity of the locking element is reduced in width, as indicated at 14, to define a transverse shoulder 15, and the outer or exposed longitudinal edge of the relatively wide portion of the locking element is formed with screwthreads arranged in alinement with the screwthreads 8 of the bolt so as to fit the internally screwthreaded bore of the nut 7. The nut locking element is normally retained in outwardly extended position by the tension of a spring 11 engaged at its inner end in a depression or seat 11ª formed in the inner wall of the slot 9 and engaged at its outer end with the inner longitudinal edge of the locking element 10. The outward movement of the locking element is limited by a lip or lug 16 formed upon the inner wall of the groove or slot 9 and adapted to be engaged by the inwardly curved reduced extremity 17 of the locking element.

In use, the nut 7 is rotated so as to advance upon the screwthreads 8 of the bolt shank 5, and during its inward movement the spring actuated locking element 10 is depressed or moved inwardly against the tension of the spring 11. When the outer face of the nut passes the shoulder 15 of the locking element the latter is forced outwardly under the influence of the spring 11, thus engaging the shoulder 15 behind the outer face of the nut and preventing removal of the latter. When it is desired to remove the nut the spring actuated locking element 10 is moved inwardly against the tension of the spring 11, thus moving the shoulder 15 out of the path of the nut.

What I claim is:

A nut lock including a bolt having a longitudinal groove adjacent one end thereof, a locking element pivotally secured in said groove at its outer end, said locking element having a reduced inner end defining a nut-engaging shoulder, said reduced end being adapted to engage the inner surface of the bore of a nut to limit the outward movement thereof, a lip formed upon the inner wall of said groove adapted to be engaged by the reduced end of said locking element to limit the outward movement of the latter when the nut is removed from the bolt, and means normally retaining said locking element in outwardly extended position.

In testimony whereof I affix my signature in presence of two witnesses.

HERMAN MOERBE.

Witnesses:
L. D. WINTER,
ARTHUR SCHULMANN.

Copies of this patent may be obtained for five cents each, by addressing the "Commissioner of Patents, Washington, D. C."